(12) United States Patent
Kersten (10) Patent No.: US 7,548,148 B2
(45) Date of Patent: Jun. 16, 2009

(54) INTEGRAL TRANSFORMER JUNCTION MODULE

(75) Inventor: George William Kersten, W595 Breezy Dr., East Troy, WI (US) 53120

(73) Assignee: George William Kersten, East Troy, WI (US)

(*) Notice: Subject to any disclaimer, the term of this patent is extended or adjusted under 35 U.S.C. 154(b) by 608 days.

(21) Appl. No.: 11/335,574

(22) Filed: Jan. 20, 2006

(65) Prior Publication Data

US 2006/0187574 A1 Aug. 24, 2006

Related U.S. Application Data

(63) Continuation-in-part of application No. 10/866,082, filed on Jun. 14, 2004, now abandoned.

(60) Provisional application No. 60/477,763, filed on Jun. 12, 2003.

(51) Int. Cl.
*H01F 27/02* (2006.01)
(52) U.S. Cl. ........................................... 336/90
(58) Field of Classification Search ................ 336/65, 336/90–96, 192
See application file for complete search history.

(56) References Cited

U.S. PATENT DOCUMENTS

| | | | |
|---|---|---|---|
| 2,294,766 A | 9/1942 | Williams, Jr. | |
| 3,212,563 A | 10/1965 | Schrader | |
| 3,377,487 A | 4/1968 | McNulty | |
| 3,668,513 A * | 6/1972 | Tsubouchi et al. | ......... 323/361 |
| 3,701,926 A | 10/1972 | Risk | |
| 4,349,801 A | 9/1982 | Altmann et al. | |
| 4,709,120 A | 11/1987 | Pearson | |
| 5,663,700 A | 9/1997 | Spence et al. | |
| 5,726,507 A | 3/1998 | Tipton | |
| 5,982,267 A | 11/1999 | Locht | |
| 6,031,722 A | 2/2000 | Paradis et al. | |
| 6,266,233 B1 | 7/2001 | O'Regan | |
| 6,304,429 B1 | 10/2001 | Locht et al. | |

FOREIGN PATENT DOCUMENTS

JP  5-56522 A  3/1993

OTHER PUBLICATIONS

"Loadbreak Apparatus Connectors", Cooper Power Systems Brochure, Mar. 1995, pp. 1-4.
"Primary Sectionalizing Englosures & Ground Sleeves," Maysteel® Brochure.

* cited by examiner

*Primary Examiner*—Tuyen Nguyen
(74) *Attorney, Agent, or Firm*—Foley & Lardner LLP (57) ABSTRACT

A compact integral transformer-junction module combination suitable for use in junction modules and vaults in distribution circuits and in industrial and commercial circuits, comprising: a transformer, and a sectionalizing element comprising a plurality of primary bushings, wherein the sectionalizing element is combined with the transformer into a single unit, and the plurality of primary bushings are connected together, via an internal connection within the unit.

37 Claims, 10 Drawing Sheets

INTEGRAL TRANSFORMER JUNCTION MODULE

CROSS-REFERENCE TO RELATED PATENT APPLICATIONS

This application claims the benefit of United States Non-Provisional application Ser. No. 10/866,082, filed Jun. 14, 2004, now abandoned, which claims the benefit of U.S. Provisional Application 60/477,763, filed Jun. 12, 2003, the entire contents of each, including the specification and drawings, are incorporated herein by reference.

FIELD OF THE INVENTION

The present invention relates to an electrical distribution system and a voltage transformer.

BACKGROUND OF THE INVENTION

Supplying secondary power at a junction of an underground electrical distribution system typically requires that a separate transformer be connected to a junction module. Peripheral cables within the underground distribution system may be connected between the transformers, switchgear, vaults, junction boxes, and other hardware. In one method of sectionalizing an electrical distribution system and supplying power to a local site simultaneously, cables are connected to a junction module located within a sectionalizing cabinet. The cables are then redirected from the junction module to the stand-alone transformer, which is typically located within close proximity to the sectionalizing cabinet. As an alternative, a pole mount transformer might be placed inside the sectionalizing cabinet. Whether the transformer is inside or close to the cabinet, the junction module is still connected to the transformer by external cables, cable terminations ("elbows"), and other associated connection hardware. Therefore, there is a need for a system that joins both units without the external connections.

SUMMARY OF THE INVENTION

According to one aspect of the invention, there is provided a method for combining a sectionalizing function and a transformer function for an electrical distribution system. The method includes providing a transformer, having multiple primary bushings, preferably recessed, that have a sectionalizing function, and joining the bushings and the transformer into a single unit, preferably in a single housing that provides for an internal connection of the transformer and the junction module, for example, by a connection from a bus.

The current embodiment sectionalizes the primary circuit, provides secondary power to external applications, and joins the bushings and the transformer into a single unit without using an external primary connection of the junction module to transformer. Secondary power may be provided to applications external to the system, for example, street lights, billboards, controls, etc. This embodiment eliminates the use of a stand-alone transformer, transformer pad, external cables, elbows, junction module, ground rod, and associated connection hardware. An additional advantage of the single-unit transformer junction module is that it can avoid use of unnecessary core watts or excessive winding watts by employing a properly sized unit, instead of the typical de-rated 10-kVA padmount units, in applications requiring less than 10 kVA.

According to another aspect of the invention, there is provided a system for combining a sectionalizing function and a transformer function for an electrical distribution system. The system includes a transformer, multiple bushings, preferably recessed, having a sectionalizing function, and typically a fuse or a fuse holder that protects the high voltage and low voltage connections. Multiple bushings are bussed together and are combined with the transformer into a single unit, preferably in a single housing that provides for an internal connection of the transformer and the junction module, for example, by a connection from a bus. The current embodiment joins the bushings and the transformer into a single unit and provides secondary power to applications external to the system, for example, street lights, billboards, controls, houses, etc., without using one of the primary connectors to provide the connection between the transformer and junction module. The embodiment also provides energy efficiency substantially higher than methods employed in typical pad mounted applications less than 10 kVA. The bushings are preferably recessed from the front elevation of the unit and are preferably vertical or upwardly angled to aid in the installation and removal of elbow connectors during typical pad mount applications.

In one embodiment, a fuse holder secures a fuse stabber, which contains a fuse that protects a core/coil assembly of the transformer. The tube may be mounted in the deck at an angle, preferably multi-dimensional angles, sufficient to permit removal of the fuse stabber when the transformer junction module is installed in a cabinet or vault, such that upon removal it clears the cabinet overhang and minimizes dielectric fluid spill or contamination of the molded rubber products. The transformer may be protected within the assembly by a fuse, a fault interrupter, or other appropriate method. The system may also include a fuse holder tube (the "tube"), which may be inserted into the surface of the transformer junction module deck for securing a transformer protection assembly. Alternatively, the system may include an internal full range current limiting fuse, in order to protect the transformer assembly. There may also be cases where no overcurrent protection is required, thus eliminating the need for a protection assembly of any kind.

In another embodiment, there is provided a system for combining a sectionalizing function and a transformer function for an electrical distribution system. The system includes a transformer, multiple primary bushings, preferably recessed, having a sectionalizing function, and typically a fuse holder or current limiting fuse that protects a core/coil assembly. The secondary power provided through secondary bushings, secondary blocks or other method in a secondary compartment that is accessed through a separate door, different angle or other method from that used for accessing the primary bushings. The compartment is distinct and separate from the primary bushing area, preferably separated or defined by dielectric material to increase safety for personnel. The dielectric boards supporting the secondary bushings or blocks can be mounted on hinges, slides, or other method to allow for movement which will facilitate a visible break from the energized transformer, to visibly indicate separation of secondary connections. Alternatively, the secondary connectors themselves can be movable in order to provide such a visible break. In another embodiment, the compartment may be a portion of the internal space within a housing that further defines a separate compartment. Alternatively, the secondary compartment may be positioned adjacent to a larger enclosure for housing the primary bushings. The secondary power connections may be coupled to a fusing system, such as a current limiting fuse. The secondary compartment may facilitate the use of a current limiting fuse in order to protect the transformer junction module. The secondary compartment further facilitates the use of a switch (e.g., an air switch) on the secondary connections, in order to isolate the low voltage leads. In yet another embodiment of the invention, a switch may be provided for selectively isolating the primary and/or secondary connections, thereby isolating the high and low voltage leads.

In another embodiment, there is provided a system for combining a sectionalizing function and a transformer function for an electrical distribution system. The system includes a transformer, multiple primary bushings, preferably recessed, having a sectionalizing function, and typically a fuse holder that protects a core/coil assembly. Internal to the primary bushing/transformer housing itself is a core/coil assembly, the internal section of the fuse tube and a gas deflecting assembly, which diverts and diffuses gases, generated within the housing from arcing under dielectric fluid (e.g., from switching or an over-current event). This housing deflects conductive gases away from the ground plane and directs these gases up and over to the area of the safety relief valve. Alternatively, an embodiment of this system may include a current limiting fuse in order to protect the transformer junction module.

In another embodiment, the external wall of the gas deflecting assembly, opposite the side on which gases may be generated, is used to support internal protective devices; in the preferred embodiment this means a back up partial range current limiting fuse. This housing can thus advantageously serve as a mechanical support mechanism for current limiting, other fusing or over-current devices and/or internal over-voltage protection device, such as a MOV arrester or other method of protecting for over-voltage or over-current.

According to a further aspect of the present invention, there has been provided a transformer unit, comprising: a transformer core with windings; at least one primary high voltage connection point on the transformer; and at least one secondary lower voltage connection point on the transformer, wherein the secondary lower voltage connection point comprises at least one secondary block mounted on a support mechanism, and the support mechanism is selectively movable to open the electrical connection between the secondary connection point and the transformer and to provide a visible indication of the opened electrical connection.

Further objects, features and advantages of the present invention will become apparent from the detailed description of preferred embodiments that follows, when considered together with the accompanying figures of drawing.

BRIEF DESCRIPTION OF THE DRAWINGS

The invention will be more readily understood by reference to the following description taken with the accompanying drawings, in which.

DESCRIPTION OF PREFERRED EMBODIMENTS

Figure 1:
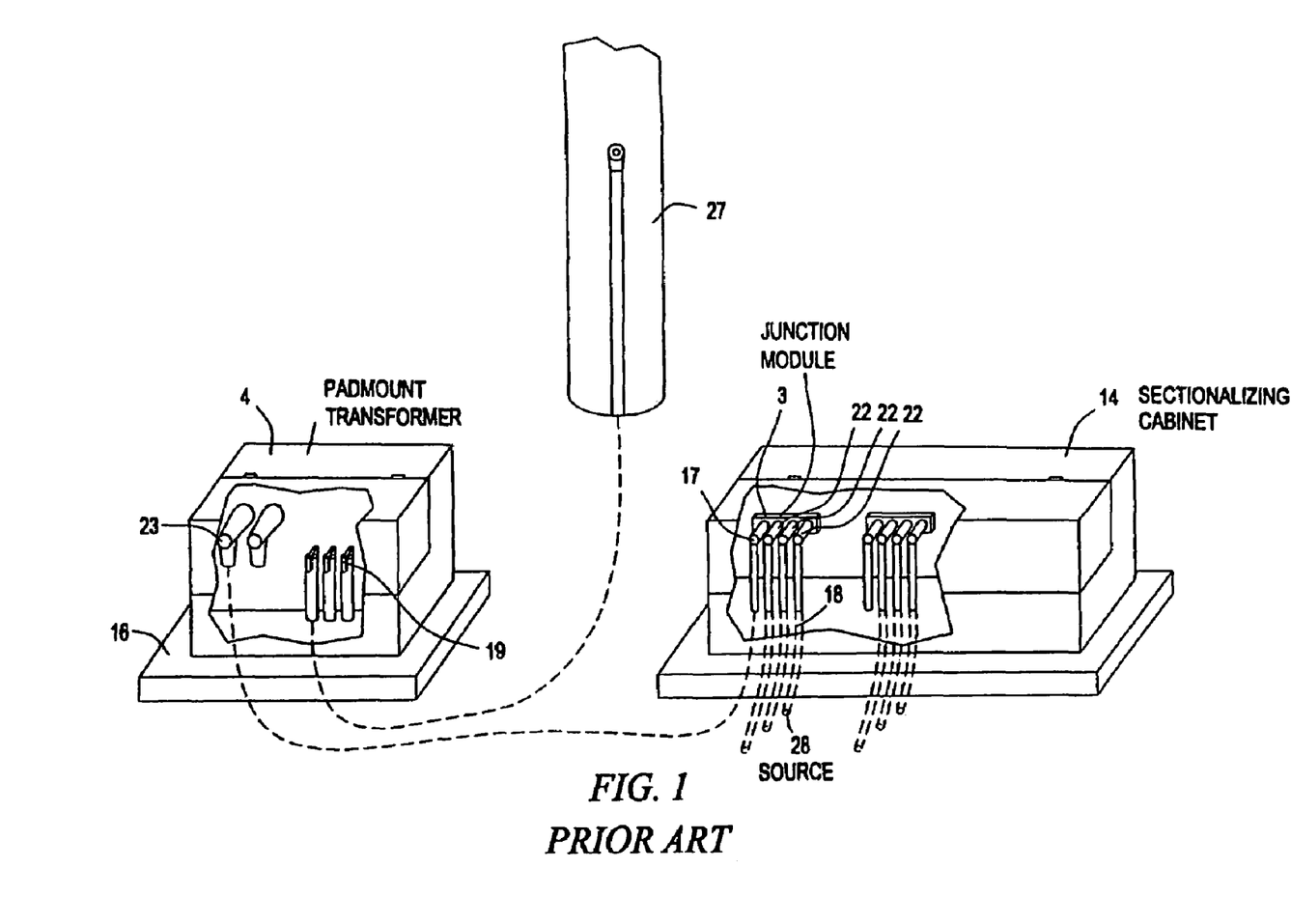
FIG. 1 shows a prior art system with a sectionalizing cabinet and an external transformer showing external connections to a junction module.

Referring now to the drawings, FIG. 1 shows a prior art system for connecting a stand-alone transformer 4 with a sectionalizing cabinet 14 containing a junction module 3. The stand-alone transformer 4 may be, for example, a pad mount transformer. Junction module 3 is connected to transformer 4 by elbow connectors 17 and cables 18 from one of the junction module positions 22 to one of the primary bushings 23 of transformer 4. Junction module 3 may consist of four junction module positions 22, which typically connect to transformer 4 and an external power source 28, leaving typically two positions available to route power or one position for connecting a lightning arrester and one position to route power. Typically, three transformer junction modules 3 are installed in a sectionalizing cabinet 14 to accommodate three-phase power, but configurations may vary based on system requirements.

Stand-alone transformer 4 is typically mounted on a transformer pad 16. Transformer 4 typically consists of two primary bushings 23, in which one of the connections is to one of the junction module positions 22. Transformer 4 also typically consists of three low voltage secondary terminals 19. The secondary terminals 19 are typically used to supply power to applications 27 external to the system, such as streetlights, billboards, controls, etc.

Figure 2:
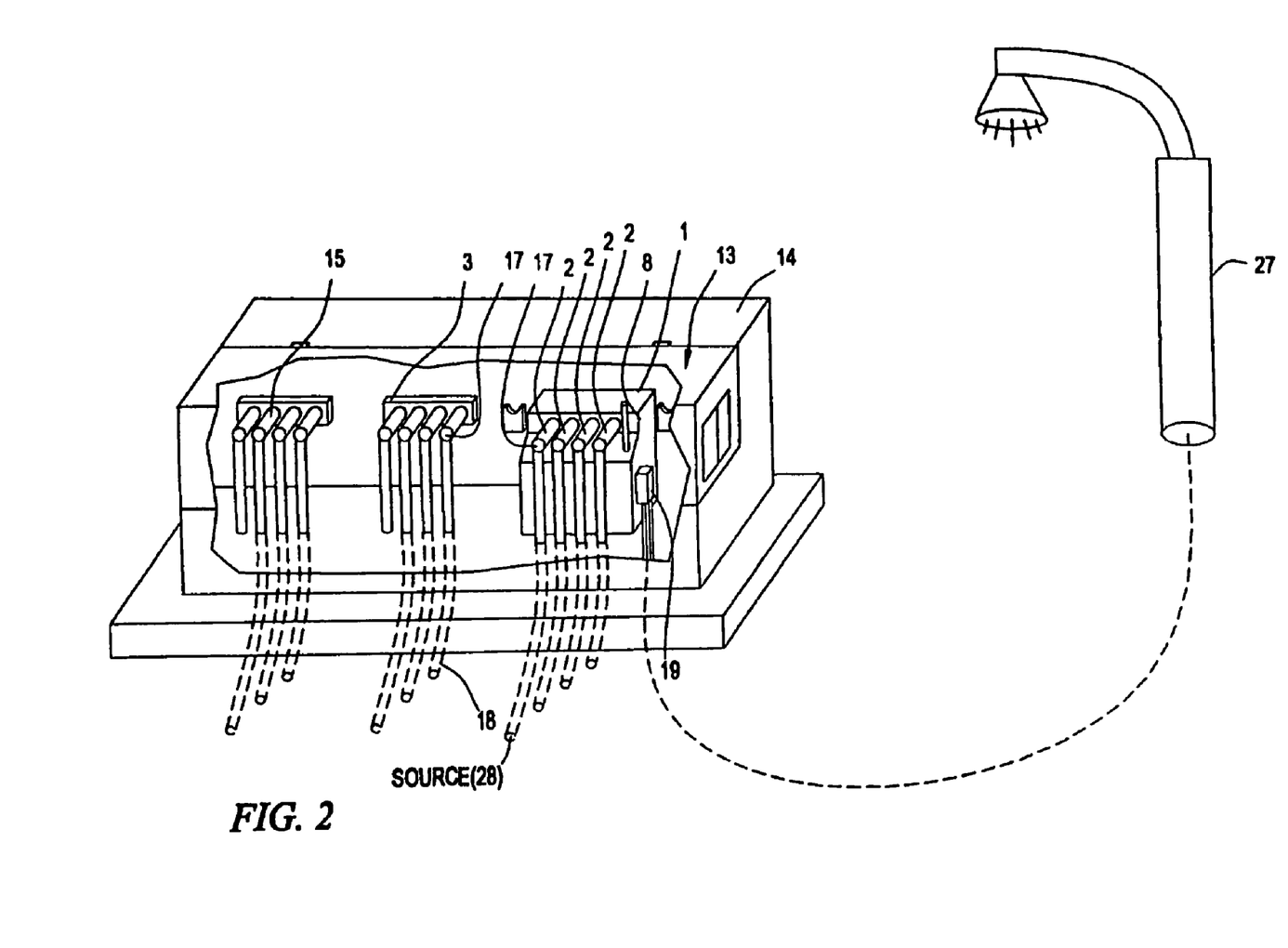
FIG. 2 shows a transformer junction module installed in a sectionalizing cabinet in accordance with one embodiment of the present invention.

FIG. 2 shows a transformer junction module 1 installed in a sectionalizing cabinet 14 in accordance with one embodiment of the present invention. In particular, FIG. 2 is a cutaway illustration of the typical sectionalizing cabinet 14, showing a layout of the cabinet 14 with a transformer junction module 1 installed. Typically, a sectionalizing cabinet 14 may contain two junction modules 3 and a transformer junction module 1, but configurations may vary based on system requirements. The transformer junction module 1 includes recessed bushings 2 and a built-in transformer (not shown in detail). One of the bushings 2 connects to an external source 28, while the remaining bushings 2 can route power in multiple directions. Bushings 2 route sectionalized power through elbow connectors 17 or similar appropriate coupling devices. Elbows 17 and junction modules 3 may also be referred to as molded rubber products 15. Bushings 2 and core/coil assembly 24 (see FIG. 5) of the transformer are connected internally within the transformer junction module 1, i.e., preferably within a single housing. Bushings 2 are connected internally by a bus 29 (see FIG. 5), and core/coil assembly 24 is powered by an internal lead from bus 29 to a fuse located at the end of a fuse stabber 7. (See FIGS. 3 and 5.) Transformer junction module 1 advantageously does not require an additional external connection to a stand-alone transformer 4. (See FIG. 1.) It should be understood that although bushings 2 and the transformer will be described in detail herein as housed in a single unit, one or more of the embodiments of integral transformer junction module 1 may comprise either a single enclosure, more than one enclosure joined together as a single unit, or a relatively small enclosure coupled to or positioned, at least partially, within a larger enclosure, all of which will be defined as a single unit for the purposes of the invention disclosed herein.

As shown in FIG. 2, the transformer junction module 1 design provides for an extra bushing 2, allowing the system to route power in three directions. The extra bushing 2 on the transformer junction module 1 can also be connected to a lightning arrester, which further enhances the system reliability. The transformer junction module 1 also provides secondary low voltage bushings 19, which may be used to supply power to applications 27 external to the system, such as streetlights, billboards, traffic controls, etc.

Figure 3:
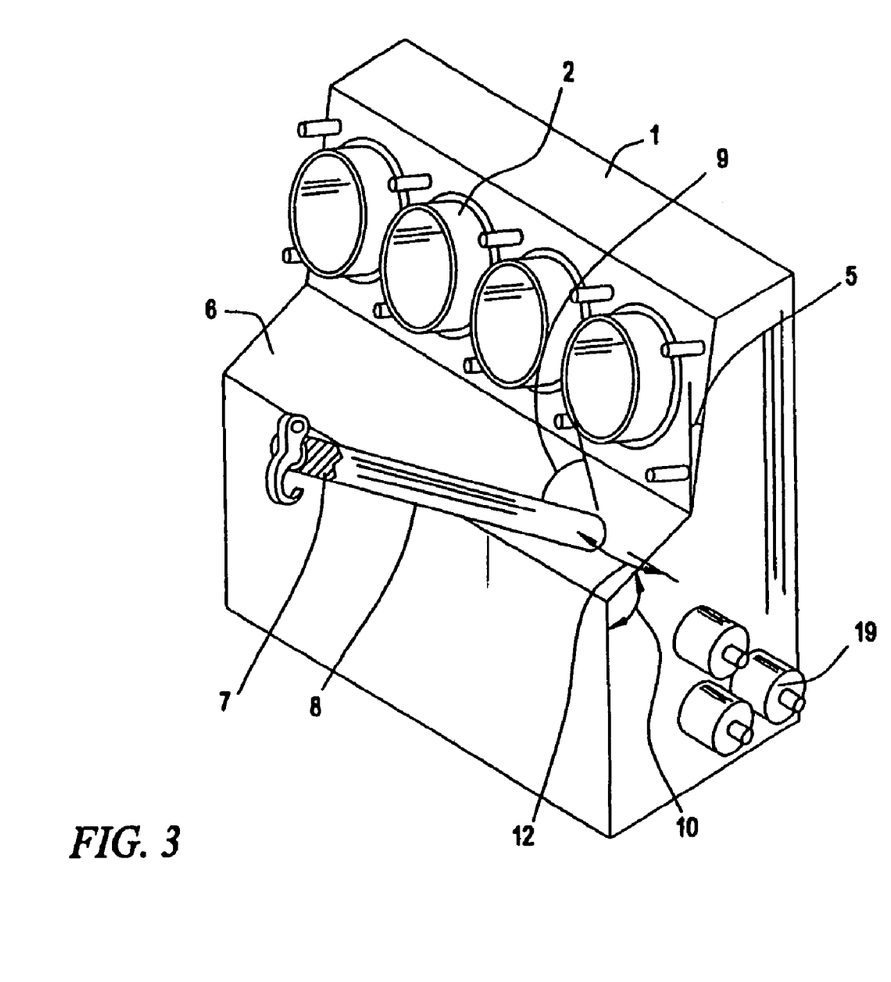
FIG. 3 shows an isometric view of a transformer junction module with top-mounted horizontal bushings in accordance with one embodiment of the invention.

FIG. 3 shows an isometric view of a transformer junction module 1 with top front surface-mounted horizontal bushing wells prior to installation of bushing inserts. The recessed bushings 2 may be bussed together (see FIG. 5) in any manner desired to aid in sectionalizing based on the requirements of the specific system. Bushings 2 are preferably angled upward either by angling the bushings 2 and/or by angling the front wall upward at an angle 5, to aid in installation and removal of elbow connectors 17 during pad mount applications. (See FIG. 2). The deck 6 of the transformer junction module 1 is preferably angled downward at an angle 10 from the bushings 2 to increase strike distance during bushing 2 removal, to aid in runoff of any excess liquids that may gather on the deck, and to eliminate excess material costs and provide efficient use of space. Angle 10 is preferably within one hundred to one hundred thirty-five (100 to 135) degrees, i.e., a 10 to 45 degree slope. FIG. 3 also illustrates the secondary low voltage connection points, in this case, bushings 19, which supply power to applications 27 external to the junction system, such as streetlights, billboards, controls, etc.

Figure 4:
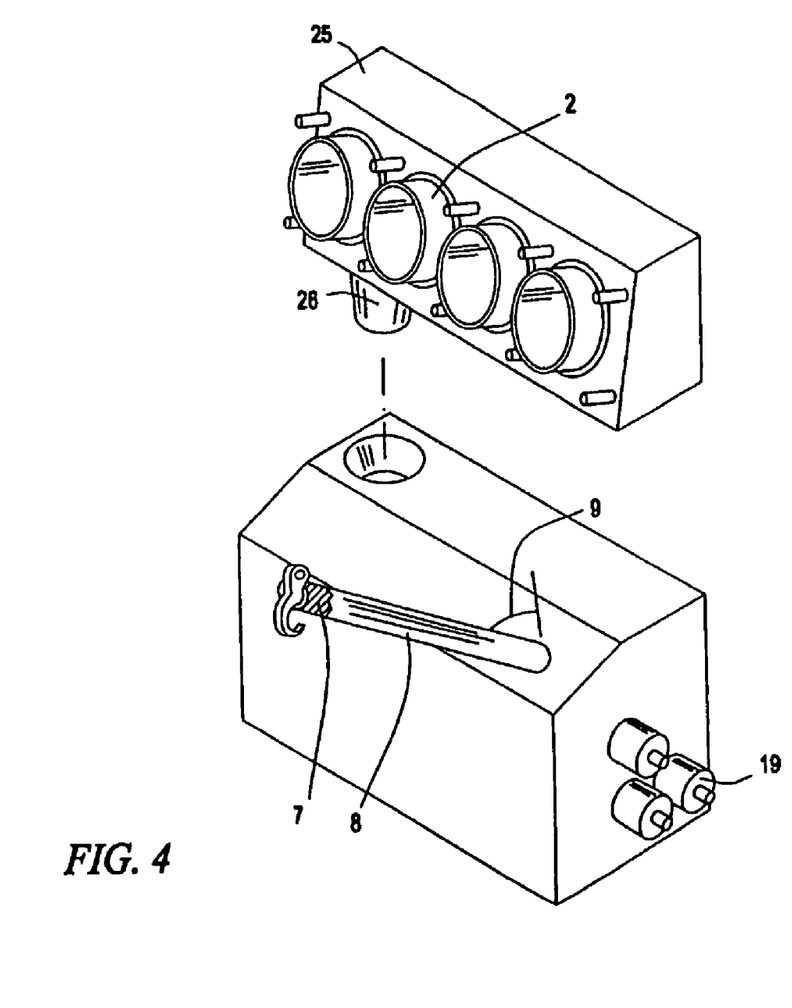
FIG. 4 shows an isometric view of a transformer junction module with removable top-mounted horizontal bushings in accordance with one embodiment of the invention.

FIG. 4 shows an isometric view of a transformer junction module 1 with removable top-mounted horizontal bushings 25. The bushings 2 of the transformer junction module 1 can be designed as one piece with the transformer unit or as a removable top-mounted molded or other method of construction integral bushing unit 25. The removable top-mounted bushings 25 can be connected to the base unit, for example, with a quick-connect dead front interface 26, such as an integral tulip contact or similar appropriate method. The quick-connect dead front interface 26 may be mounted with the base as a single unit, still providing an internal connection of the transformer and the bushings 2 by an internal lead from bus 29 (see FIG. 5) to a fuse located at the end of a fuse stabber 7. This split design can increase the ease of system maintenance and assist in system reliability by enhancing access to the system's parts.

Figure 5:
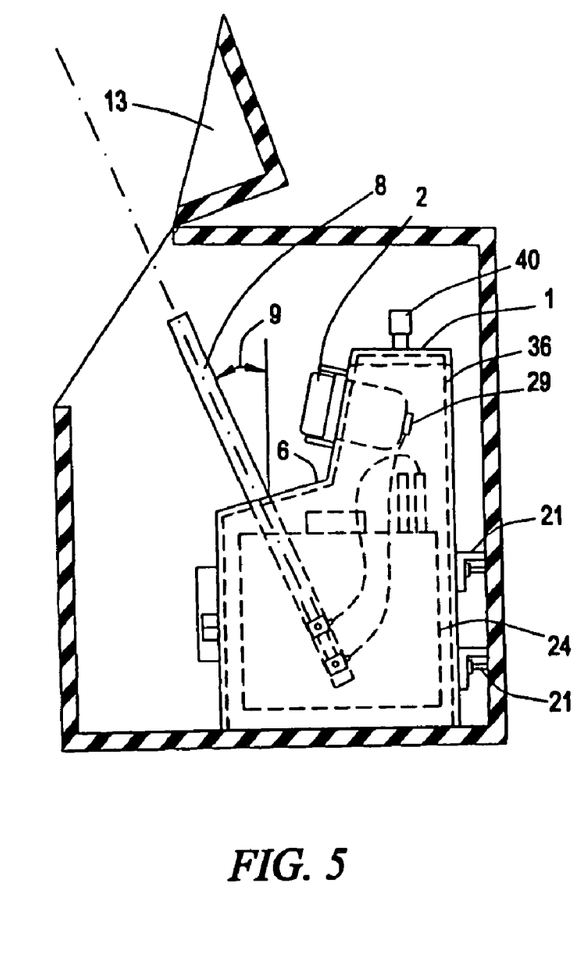
FIG. 5 shows a core/coil assembly of the transformer junction module of FIG. 2 and a fuse holder tube projecting from the deck of the transformer junction module of FIG. 2.

FIG. 5 shows in cross-section a core/coil assembly 24 of a transformer junction module 1 and a fuse holder tube 8 projecting from an angled deck 6 of the transformer junction module 1 in accordance with one preferred embodiment. Core/coil assembly 24 feeds off a main system by a transformer protection assembly, other embodiments may not require over-current protection. Bushings 2 and core/coil assembly 24 of the transformer are connected internally within the transformer junction module 1. A bus 29 connects primary bushings 2 internally, and core/coil assembly 24 is powered by an internal lead from the bus 29 to the fuse located at the end of a fuse stabber 7. (See FIG. 3.) A fuse positioned at the end of a fuse stabber 7 is one implementation of the transformer protection assembly. (See FIG. 3.) Fuse stabber 7 is inserted within a fuse holder tube 8 that is positioned within the surface of an angled deck 6. The length and orientation of the fuse holder tube 8 and fuse stabber 7 are selected based on system requirements and specifications, relating to the size and configuration of the cabinet 14. Surrounding the internal portion of the fuse tube is a gas deflector 36 which shields the ground plane from conductive ionized gases that are generated under certain conditions. In addition to shielding the ground plane the deflector also directs gases in the direction of the pressure relief valve 40.

Lateral angle 9 of the fuse holder tube 8 is preferably within zero to eighty (0 to 80) degrees of a longitudinal vertical plane, which is sufficient to permit removal of fuse stabber 7 when the transformer junction module 1 is installed within the sectionalizing cabinet 14, such that it clears overhang 13 of the cabinet 14. In other implementations unrestricted by cabinet overhang 13, such as buildings or vaults, the fuse angle can vary outside of this range. Longitudinal angle 12 (See FIG. 3) of the fuse tube holder 8 is preferably within forty-five to ninety (45 to 90) degrees of a longitudinal horizontal plane, which is additionally sufficient to facilitate removal in a direction that will minimize oil spill or avoid contamination of molded rubber products 15 (see FIG. 2) from any liquid dielectrics. Transformer junction module 1 can be mounted in a sectionalizing cabinet 14 (See FIG. 2) in nearly any convenient manner, for example, using slotted brackets 21 to secure the transformer junction module 1 to the back wall of the cabinet 14. An optional mounting stand 20 (not shown) can also be used to support the transformer junction module 1 within the sectionalizing cabinet 14.

Figure 6:
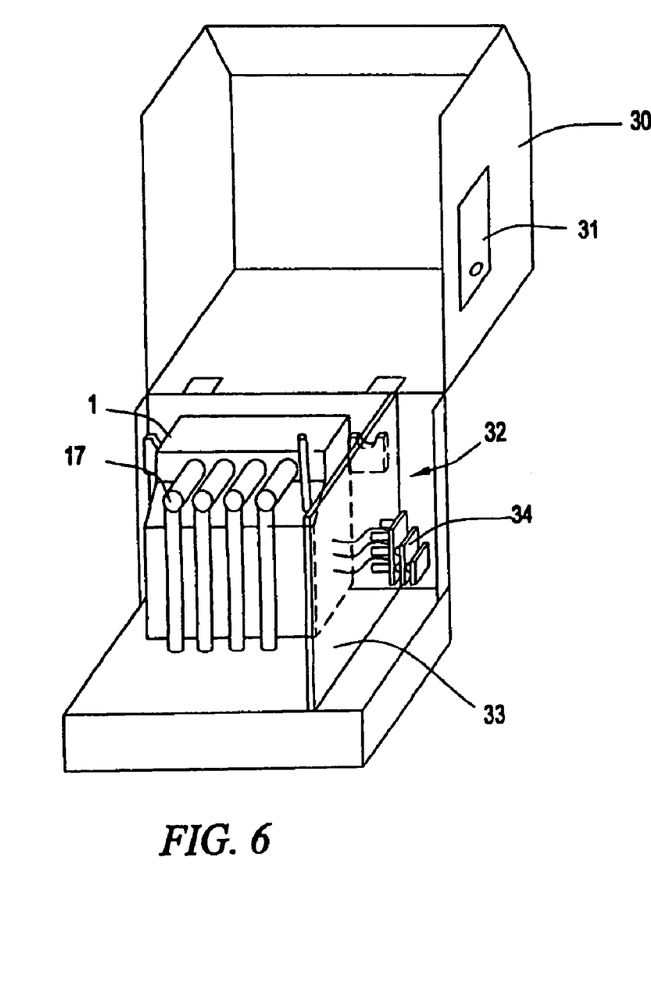
FIG. 6 is a perspective view showing a transformer junction module in accordance with a second principal embodiment of the present invention.

FIG. 6 shows a second preferred embodiment for providing a stand-alone transformer junction module 1 with the multiple bushings 17 in the recessed position in a single housing 30 specially designed to contain the unit. For simplicity, and in one preferred arrangement of the device, only four primary bushings are contained in the compact device, as shown. However, it is understood that fewer or more primary bushings may also be provided in such an arrangement, depending upon the intended application. The unit has a separate side access door 31 for accessing the secondary bushings or connections 34 in the secondary compartment 32. This unit provides the primary sectionalizing function and secondary power in one compact and low profile unit. This unit has all of the features referred to in connection with the first embodiment, but is embodied in a compact housing rather than being intended for installation in a sectionalizing vault or cabinet, possibly previously existing. Additionally the secondary compartment 32 is at least spatially separated and is furthermore preferably physically separated from the primary compartment by a non-conductive partition 33 for added safety. This partition of non-conductive material provides insulation and provides electrical clearance so that no high voltage components come in contact with the low voltage components. This barrier 33 also protects individuals from coming in contact with high voltage components when accessing the unit through the side access doors 31. As in the case of the embodiment of FIG. 2, the transformer-junction module combination can be mounted on the inside rear wall of housing 30, for example, by means of a bracket arrangement or other fastener. Alternatively, the combined unit can be welded or otherwise more permanently fastened to the inside wall of the housing 30.

Figure 7:
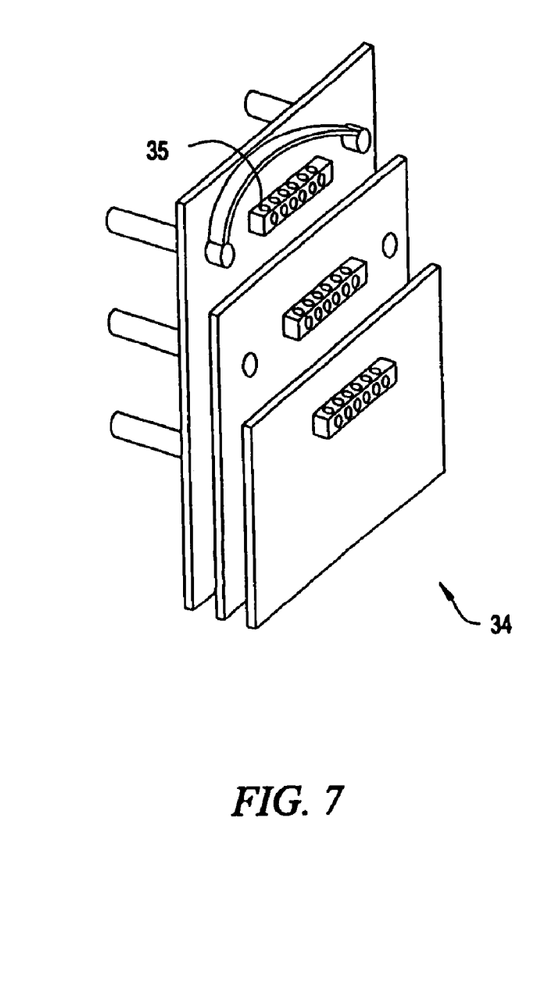
FIG. 7 is a detailed perspective view showing the secondary connectors in the device of FIG. 6.

FIG. 7 shows one preferred embodiment for providing secondary connections on a secondary connection assembly. The secondary wires are brought up from the ground and connected to the secondary blocks 35. This block assembly can be pulled away from the main transformer junction housing by a handle or other method and pivot on hinges at the bottom or side of the unit and may be disconnected from the electrical circuit by tulip contacts, blade contacts or other method, to provide a visible break to operators. This allows operators to open the circuit to insure they are working on de-energized equipment. Alternatively, the non-conductive partition can be made to move in a way that provides a visible break in the connection of the secondary connection assembly. Obviously, this feature can be used in conjunction with any transformer assembly, i.e., it does not require the integrated transformer-junction module employed according to the preferred embodiment of the present invention.

Figure 8:
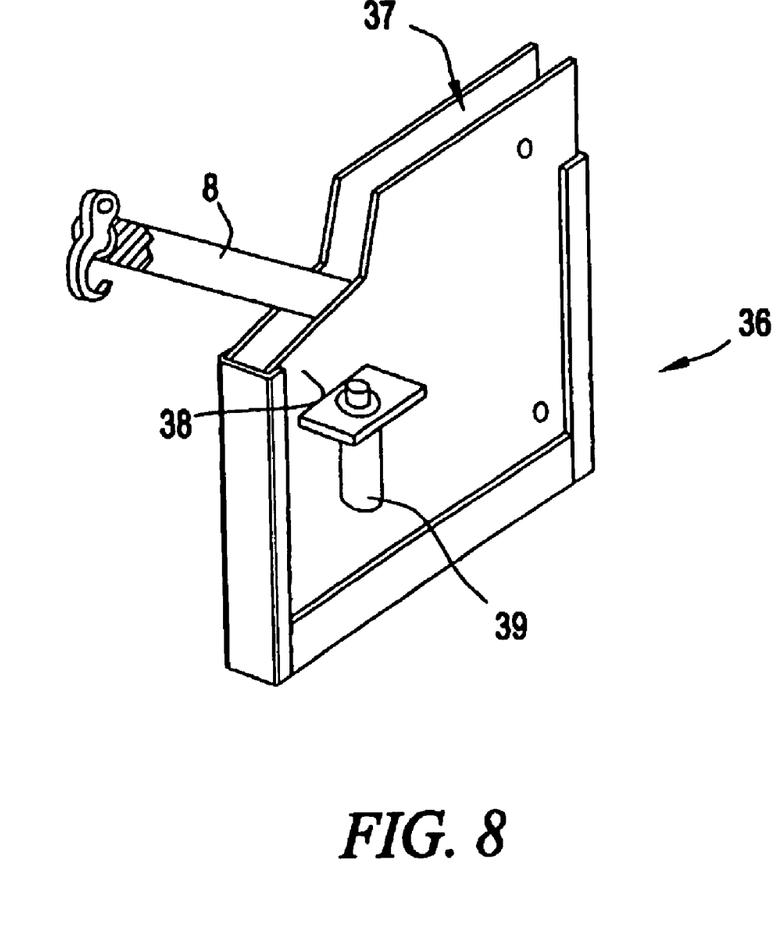
FIG. 8 is a perspective view illustrating a gas deflector unit that may be included in the devices according to the invention.

FIG. 8 shows in more detail the gas deflector 36, which is internal to the housing of the transformer junction box 1. The upper portion of the unit 37 is open to allow for directing of the rising gases to the pressure relief area of the housing (not shown in detail) when gases are generated in the case of an arcing event from a fuse, switch or other method. The sides, bottom, front and back of the unit are constructed of a non-conductive material. The top sections are preferably partially covered to insure that gases are directed to the area of the pressure relief valve. The external wall 38 of the housing can preferably be used to support a fuse 39 or other protective device that may require internal support.

Figure 9:
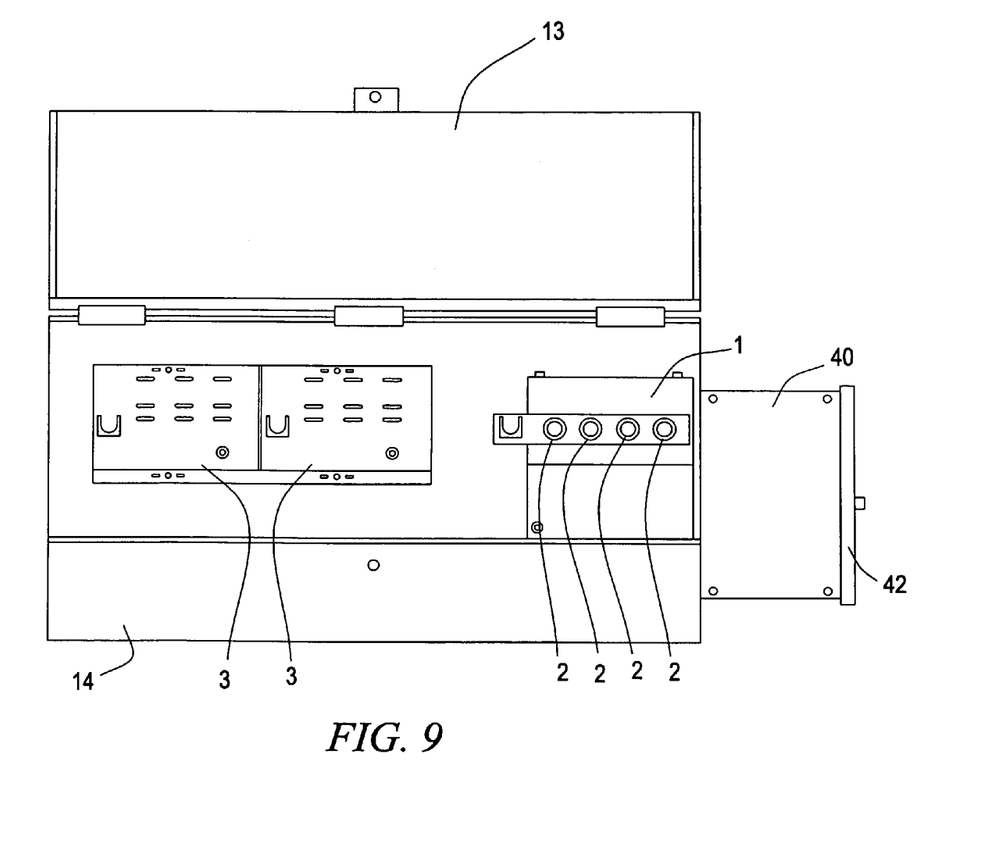
FIG. 9 is a shows a transformer junction module installed in a sectionalizing cabinet in accordance with one embodiment of the present invention.

Referring now to FIG. 9, transformer junction module 1 installed in a sectionalizing cabinet 14, in accordance with another embodiment of the present invention, is shown. In particular, FIG. 9 is an illustration of transformer junction module 1 and two junction modules 3. Transformer junction module 1 includes recessed bushings 2 and a transformer (not shown in detail). Sectionalizing cabinet 14 also includes a cabinet overhang 13, which may be coupled to sectionalizing cabinet 14 in order selectively expose transformer junction module 1 for switching or servicing operations. Sectionalizing cabinet 14 further includes a secondary compartment 40 for accessing the secondary bushings or connections 44, switch 41, and current limiting fuse 42 (shown in FIG. 11), which are housed therein. Current limiting fuse 42 is configured to protect transformer junction module from overloading the low voltage side, particularly to protect against overcurrent in the circuit, and is preferably housed within a fuse holder. Switch 41 is shown as an external switch located in secondary compartment 40, which is accessible for servicing transformer junction module 1; however, switch 41 may be implemented as an internal switch in other embodiments of the invention. Current limiting fuse 42 facilitates the use of switch 41 for isolating the low voltage connections. For example, when servicing or switching is being performed, a servicing individual, such as a lineman, may isolate the low voltage connections by use of switch 41, in addition to providing a visible break on the load voltage connections via the fuse holder.

Additionally, secondary compartment 40 is at least spatially separated from the compartment of the primary connections by a non-conductive material for added safety. The non-conductive material preferably provides insulation and provides electrical clearance to minimize high voltage components potentially coming into contact with the low voltage components or servicing individuals, such as a lineman. Separate compartment 40 may also be spatially separated by providing a separate access door 45 (not shown in detail) to secondary connections 40 of transformer junction module 1. As discussed in more detail below, the separate access door 45 may be positioned either internal or external to the housing for the primary bushings, for enhanced safety and access to secondary connections 44.

Figure 10:
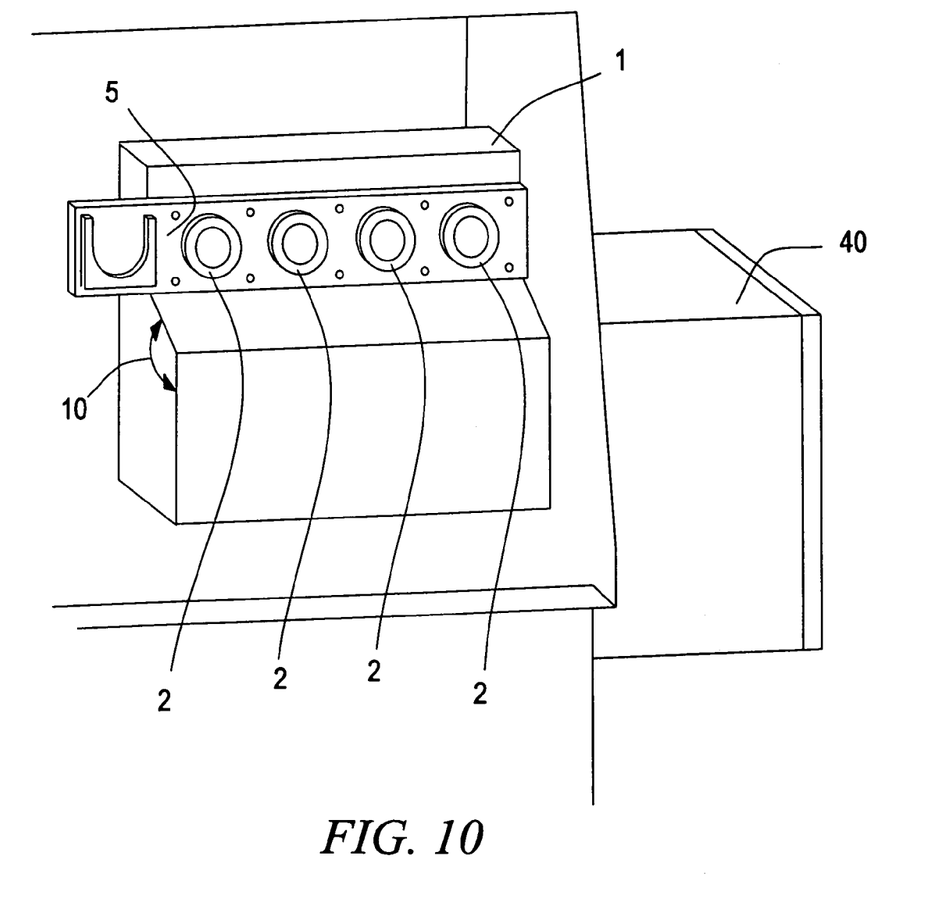
FIG. 10 is a detailed perspective view of a transformer junction module installed in a sectionalizing cabinet of FIG. 9.

Referring now to FIG. 10, a detailed perspective view of a transformer junction module installed in a sectionalizing cabinet of FIG. 9 is shown. Bushings 2 may be bussed together in any manner desired to aid in sectionalizing based on the requirements of the specific system. Bushings 2 are preferably angled upward either by angling the bushings 2 and/or by angling the front wall upward at an angle 5, to aid in installation and removal of elbow connectors (shown in FIG. 2). The deck 6 of the transformer junction module 1 is preferably angled downward at an angle 10 from the bushings 2 to increase strike distance during bushing 2 removal, to aid in runoff of any excess liquids that may gather on the deck, and to eliminate excess material costs and provide efficient use of space.

According to another embodiment of the invention, the transformer may be protected within the core/coil assembly by an internal fusing system (not shown in detail). The fuse is preferably an internal full range current limiting fuse, which is configured to protect the transformer from a "bolted fault" or an internal failure. The fusing system may be submerged or sealed within the tank of the core/coil assembly 24 (FIG. 5). The fusing system is configured to isolate a failed core/coil assembly from the bushings 2 and bus 29 (FIG. 5), which enables continuous operation of the primary feeder circuit. The fusing system may be further coupled to a switch for the high voltage connections. The switch would enable isolation of core/coil assembly 24 from bushings 2 for efficient energy use when core/coil 24 is not being energized. In another embodiment, a fusing system may be provided such that a fuse is positioned between bus connection 29 and bushings 2, wherein the terminal of each bushing 2 would be coupled to the source bus connection 29 via a fuse. In other embodiments, fault interrupters or vacuum bottles may be employed to perform a similar function between bus connection 29 and bushings 2.

Figure 11:
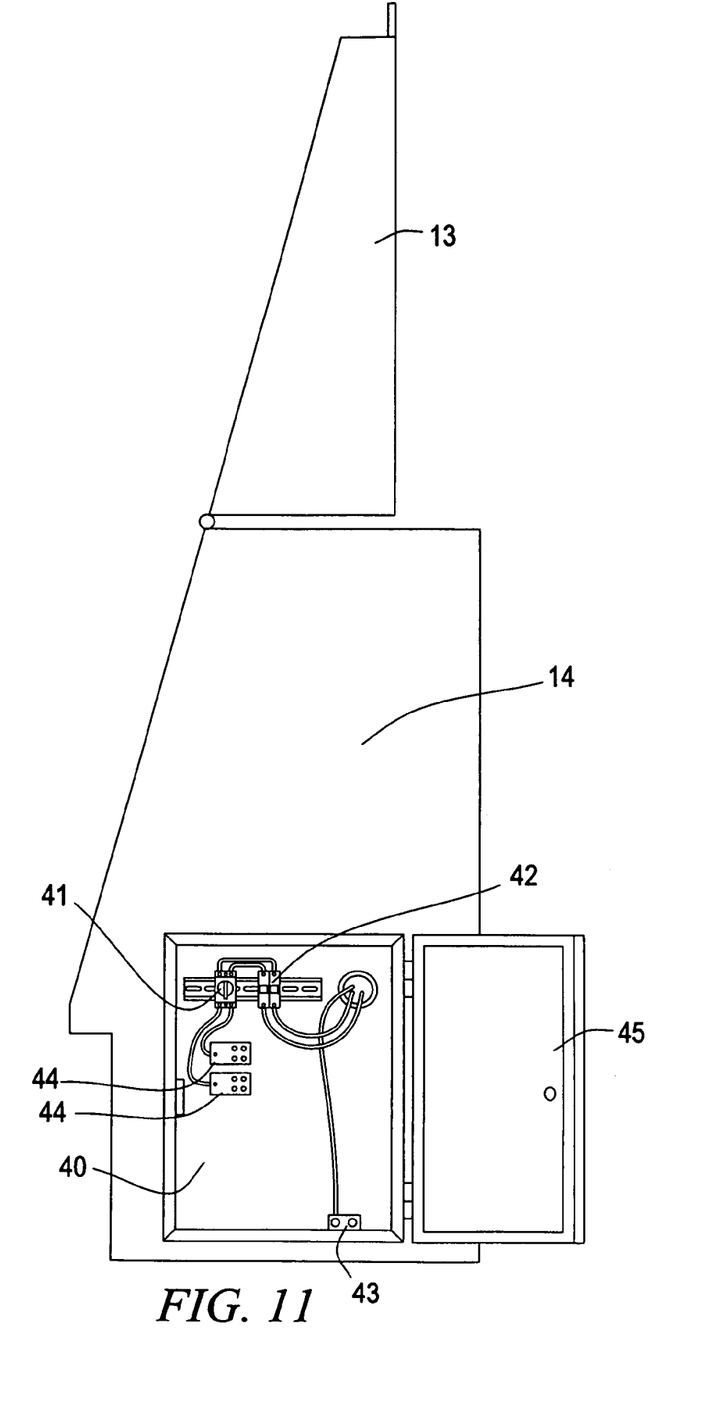
FIG. 11 is a side view of the transformer junction module of FIG. 9, showing the secondary compartment for housing the secondary connections.

FIG. 11 is a side view of transformer junction module 1 showing the secondary compartment 40 for housing the secondary connections 44. Secondary connections 44 preferably provide low voltage power to systems external to the junction system, such as streetlights, billboards, controls, etc. Secondary compartment 40 also preferably houses current limiting fuse 42, which is configured to protect transformer junction module 1 from overloading on the low voltage side. Switch 41 preferably isolates the low voltage leads, wherein it preferably provides a visible break via a fuse holder between secondary connections 44 and the transformer. Switch 41 can, for most applications, be a simple air switch; however, if needed for special applications, such as in flood plain areas, switch 41 can be configured as a switch that is submerged in the transformer dielectric fluid and merely actuated from separate compartment 40. Ground block 43 provides a ground reference for the circuit of the secondary connections 44.

As shown in the embodiment exhibited in FIG. 11, separate compartment 40 may be positioned adjacent to the housing for the primary connections, providing a separate access door 45 for secondary connections 44. In other embodiments, separate compartment 40 may be implemented as an enclosure positioned partly or entirely within the housing for the primary connections, wherein separate access is provided to the low voltage connections, either through separate access door 45, through cabinet overhang door 13 of sectionalizing cabinet 14, or through a separate access door located with sectionalizing cabinet 14. One advantage in using a separate compartment, wherein the compartment is merely attached to an external wall of sectionalizing cabinet 14 is that a smaller secondary compartment may be employed, which thereby more efficiently uses the space within sectionalizing cabinet 14 for the primary circuitry, often enabling an industry standard-sized cabinet or a smaller sectionalizing cabinet to be employed.

Any use of the term "bushing" is intended to cover and incorporate all forms including, without limitation to, bushing wells, bushing wells with inserts, integral one-piece bushings, and bushings of any ampere rating, setting, or configuration. Other substitutions, modifications, changes and/or omissions may be made in the design, operating conditions and arrangement of the preferred and other exemplary embodiments without departing from the present invention as described herein. The term "compartment" in reference to secondary compartment is defined as an area that is physically or at least spatially separated from any high voltage components. The purpose of this compartment is to increase safety and provide at least a spatial separation and preferably a physical separation when operating the unit between the high voltage and low voltage components; it is a distinct separated area in which only low voltage components can readily be accessed.

Throughout the specification, numerous advantages of preferred embodiments have been identified. It will be understood of course that it is possible to employ the teachings herein so as to without necessarily achieving the same advantages. Additionally, although many features have been described in the context of a transformer junction module, it will be appreciated that such features could also be implemented in the context of other types of power distribution equipment as well, which may require certain electrical and/or electromechanical systems to receive and distribute electrical power.

It is important to note that the construction and arrangement of the transformer junction module as shown in the various preferred and exemplary embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, elements shown as multiple parts may be integrally formed, the position of elements may be reversed or otherwise varied, and the nature or number of discrete elements or positions may be altered or varied. Accordingly, all such modifications are intended to be included within the scope of the present invention, as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

Many other changes and modifications may be made to the present invention without departing from the spirit thereof.

What is claimed:

1. An integrated junction module and transformer unit suitable for use in above-ground applications and vaults in electrical distribution circuits and in industrial and commercial circuits, comprising: an external housing configured for containing the integrated junction module and transformer unit, the housing being adapted for above-ground or vault electrical applications, a transformer, and a junction box having a plurality of primary bushings configured for high voltage distribution in an above-ground application or in a vault application, the plurality of primary bushings including at least one input bushing and one output bushing, wherein the junction box is combined with the transformer into a single integrated unit in the external housing, and the plurality of primary bushings are connected together, via an internal connection within the unit.

2. An integrated junction module and transformer unit as claimed in claim 1, wherein the plurality of primary bushings are connected together by a bus connection.

3. An integrated junction module and transformer unit as claimed in claim 1, further comprising at least one connection point for supplying secondary power to application(s) external to the housing.

4. An integrated junction module and transformer unit as claimed in claim 3, wherein the transformer has a power rating of less than 10 kVA.

5. A transformer-junction module combination as claimed in claim 3, further comprising a device for protecting the connection point for supplying secondary power.

6. A transformer-junction module combination as claimed in claim 5, wherein the device for protecting the connection point for supplying secondary power comprises a current limiting fuse.

7. A transformer-junction module combination as claimed in claim 5, further comprising a switch and a fuse holder, the switch being configured for isolating the connection point for supplying secondary power and the fuse holder providing a visible break in a circuit formed by the connection point for supplying secondary power.

8. An integrated junction module and transformer unit as claimed in claim 1, wherein the primary bushings comprise bushings that are recessed from the front elevation of the unit and are vertical to upwardly angled to aid in the installation and removal of elbow connectors.

9. An integrated junction module and transformer unit as claimed in claim 1, further comprising a device for protecting a core/coil assembly of the transformer from over-current.

10. An integrated junction module and transformer unit as claimed in claim 9, wherein the protection device comprises a fuse and a fuse holder.

11. An integrated junction module and transformer unit as claimed in claim 1, wherein the unit has a front cover leading up to the primary bushings, the front cover forming a deck that is angled down from the bushings to the front cover surface.

12. A transformer-junction module combination as claimed in claim 9, wherein the device for protecting the core/coil assembly comprises at least a current limiting fuse.

13. An integrated junction module and transformer unit as claimed in claim 3, wherein the secondary bushings are separated from the primary bushings by non-conductive material covering.

14. An integrated junction module and transformer unit as claimed in claim 1, further comprising a device for mounting the unit into said housing configured as a cabinet or vault.

15. An integrated junction module and transformer unit as claimed in claim 14, wherein the mounting device comprises at least one reversible slotted mounting bracket.

16. An integrated junction module and transformer unit as claimed in claim 1, wherein the junction box is mounted on top of the transformer.

17. An integrated junction module and transformer unit as claimed in claim 16, further comprising a quick-connect, selectively removable connection between the transformer and the junction box.

18. An integrated junction module and transformer unit as claimed in claim 16, further comprising a protective device for protecting the transformer core/coil assembly against over-current, wherein the protective device comprises a tube that enters into the transformer from the top at an angle to the vertical, and a protective member that is selectively insertable and removable from the tube, said angle being sufficient to enable removal of the protective member from the transformer located in the housing.

19. An integrated junction module and transformer unit as claimed in claim 3, wherein the connection point for secondary power comprises a plurality of secondary bushings and/or blocks.

20. A transformer-junction module combination as claimed in claim 16, further comprising a protective device for protecting the core/coil assembly against over current, wherein the protective device includes a current limiting fuse.

21. An integrated junction module and transformer unit as claimed in claim 3, further comprising a portion of the internal space of the housing that defines a separate compartment in which the connection point for secondary power is located, said compartment having an access opening for accessing the connection point for secondary power that is separate from an opening in the housing for accessing the primary bushings.

22. An integrated junction module and transformer unit as claimed in claim 21, further comprising at least one dielectric member separating the compartment from the remainder of the internal space within the housing, wherein the at least one connection point for supplying secondary power is mounted on one of said dielectric members, and wherein the combination further comprises a movable connection mechanism for said dielectric member or said connecting point, for enabling a visible break between the secondary connection(s) and the transformer.

23. A transformer-junction module combination as claimed in claim 3, further comprising a separate compartment positioned adjacent to the primary bushings, the separate compartment being configured to house the connection point for supplying secondary power.

24. A transformer-junction module combination as claimed in claim 23, wherein the separate compartment includes an access opening for accessing the connection point for supplying secondary power, the access opening being a separate opening from the opening for accessing the primary bushings.

25. An integrated junction module and transformer unit as claimed in claim 1, further comprising, internal to the combined unit, a gas deflecting assembly for diverting conductive gas generated within the housing away from the ground plane.

26. An integrated junction module and transformer unit as claimed in claim 25, further comprising at least one device for protecting against over-voltage and/or over-current, mounted on the external wall of the gas deflecting assembly, opposite to the side on which gas may be generated.

27. A method for providing secondary, low voltage power at an electrical distribution junction in an electrical distribution system, in a single unit, comprising:
supplying high voltage power to an integral transformer-junction module combination as claimed in claim 1 which is installed in a sectionalizing containment housing; stepping down the high voltage power to a low voltage power in the transformer; and supplying to at least one application, located external to the containment housing, the low voltage power from at least one secondary power connection point within the containment housing.

28. A transformer-junction module combination as claimed in claim 9, wherein the protection device comprises fault interrupter or vacuum bottle.

29. A method as claimed in claim 27, wherein the integral transformer-junction module combination further defines within the containment housing a secondary low voltage compartment protected and defined by electrical insulating materials, to insure no high voltage components come in contact with low voltage equipment.

30. An electrical distribution system comprising:
an external housing, the housing being configured for containing an electrical distribution system adapted for above-ground electrical applications or vault electrical applications;
a high-voltage power distribution apparatus, wherein the high-voltage power distribution apparatus includes a front elevation having a recessed front plate and a deck, the recessed front plate being configured to house at least one input connection and one output connection, such that the input connection and output connection are configured to be coupled to separable insulated connectors, the deck being configured to be flat or angled down from the bushings to the front elevation;
a secondary power distribution apparatus, configured to supply low-voltage power; and
a transformer, the transformer being coupled with the high-voltage power distribution apparatus into an integrated unit within the external housing,
wherein the system is configured for the at least one input connection and one output connection to sectionalize high-voltage power for distribution into a selected area, further wherein the secondary power distribution apparatus is configured to include an input connection or an output connection configured to supply low-voltage power to applications external to the system.

31. A method as claimed in claim 27, wherein the integral transformer-junction module combination further includes a separate compartment, the compartment being configured to house the secondary power connection point, wherein the compartment is positioned to abut the containment housing.

32. An electrical distribution system as claimed in claim 30, wherein the secondary power distribution apparatus is separated from the high-voltage power transmission or distribution apparatus by non-conductive material covering.

33. An electrical distribution system as claimed in claim 30, wherein the high-voltage power distribution apparatus is mounted on top of the transformer within the external housing.

34. An electrical distribution system as claimed in claim 30, wherein the secondary power distribution apparatus includes a connection point for providing secondary power, the connection point including a plurality of secondary bushings and/or blocks.

35. An electrical distribution system as claimed in claim 30, wherein the recessed front plate is angled upward to facilitate access to the at least one input connection and output connection for coupling to or removing separable insulated connectors.

36. An electrical distribution system as claimed in claim 30, wherein the at least one input connection and output connection are angled upward to facilitate coupling to or removal of separable insulated connectors.

37. An integrated junction module and transformer system, comprising: an external housing configured for use in above-ground or vault electrical distribution applications; a transformer; and a junction box having a plurality of primary bushings configured for high-voltage distribution in above-ground or vault applications, the plurality of primary bushings including at least one input bushing and one output bushing, wherein the junction box is combined with the transformer into a single integrated unit in the external housing, and the plurality of primary bushings are connected together, via an internal connection within the unit, wherein the unit has a front cover leading up to the primary bushings, the front cover including a recessed area configured to house the primary bushings, such that the front cover forms a deck that is angled down from the bushings to the front cover surface.

* * * * *